United States Patent [19]
Bleier et al.

[11] Patent Number: 5,334,827
[45] Date of Patent: Aug. 2, 1994

[54] CHIP CARD READER

[75] Inventors: Robert Bleier, Untergruppenbach; Manfred Reichardt, Weinsberg, both of Fed. Rep. of Germany

[73] Assignee: Amphenol-Tuchel Electronics GmbH, Fed. Rep. of Germany

[21] Appl. No.: 842,155

[22] PCT Filed: Sep. 21, 1990

[86] PCT No.: PCT/EP90/01608

§ 371 Date: May 4, 1992

§ 102(e) Date: May 4, 1992

[87] PCT Pub. No.: WO91/04547

PCT Pub. Date: Apr. 4, 1991

[30] Foreign Application Priority Data

Sep. 21, 1989 [DE] Fed. Rep. of Germany ....... 3931506

[51] Int. Cl.[5] ............................................. G06K 19/06
[52] U.S. Cl. .................................... 235/492; 235/380; 235/382; 235/441
[58] Field of Search ................ 235/441, 492, 380, 482

[56] References Cited

U.S. PATENT DOCUMENTS

| | | | |
|---|---|---|---|
| 4,743,746 | 5/1988 | Murschall et al. | 235/441 |
| 4,752,234 | 6/1988 | Reichardt et al. | 439/260 |
| 4,839,508 | 6/1989 | Frolov | 235/482 X |
| 4,859,199 | 8/1989 | Komatsu | 439/267 |
| 4,900,273 | 2/1990 | Pernet | 439/630 |
| 4,976,630 | 12/1990 | Schuder et al. | 235/441 |
| 5,051,566 | 9/1991 | Pernet | 235/441 |
| 5,091,618 | 2/1992 | Takahashi | 235/441 |
| 5,198,645 | 3/1993 | Martin et al. | 235/441 |

FOREIGN PATENT DOCUMENTS

| | | |
|---|---|---|
| 0139593 | 5/1985 | European Pat. Off. . |
| 0214478 | 3/1987 | European Pat. Off. . |
| 0274534 | 7/1988 | European Pat. Off. . |
| 0316699 | 5/1989 | European Pat. Off. . |
| 3808183 | 9/1988 | Fed. Rep. of Germany . |

Primary Examiner—Donald Hajec
Assistant Examiner—Adrian Young
Attorney, Agent, or Firm—Bacon & Thomas

[57] ABSTRACT

A chip card reader comprises a contact support (2) in which are arranged read contact springs (17) and an end position switch in the form of switch contact springs (21, 22) which indicates the operating mode. The read contact-springs contact regions of a chip card (13) inserted in a read position in the chip card reader. In its operating mode in the read position of the card, the end position switch acts approximately perpendicular to the direction of insertion (20) of the card. Hence, in the read position, no component of force is produced which would act in the direction opposite to that of insertion of the card.

19 Claims, 6 Drawing Sheets

CHIP CARD READER

BACKGROUND OF THE INVENTION

The invention relates to a chip card reader in general, into which a chip card can be inserted into a reading position in which contact elements provided in said chip card reader engage or contact contact zones provided on said chip card. The invention relates specifically to a chip card reader having contact elements adapted for soldering.

In known chip card readers frequently a downward movement is provided between the chip card and the chip card reader when the chip card is inserted into the reading position so as to provide a good engagement between the contact elements of the chip card reader and the contact zones of the chip card. Such chip card readers require mechanical means to provide for said downward movement. For other applications a chip card reader might be sufficient which does not use such a downward movement but uses sliding contact elements so that for instance said mechanical means for providing the downward movement for the chipcard is no longer required.

SUMMARY OF THE INVENTION

The present invention is directed to a chip card reader which operates without such a mechanical means for providing the downward movement and which uses contact elements sliding on the chip card.

Chip card readers of this type typically use a contact support within which reading contact elements (reading contacts) are provided for the engagement with the contact zones on the chip card when the chip card is located in its reading position. Further such chip card readers commonly use an end position switch which is either closed or open so as to supply that the reading position of the chip card is reached.

So as to obtain a chip card reader which can be manufactured at favourable cost but also functions safely the present invention provides an end position switch which is designed and arranged in the contact support such that it acts in its actuated condition, which indicates the reading position of the chip card, approximately perpendicular with respect to the direction of insertion of the chip card. I.e. the end position switch does not generate a force component which acts in a direction opposite to the direction of insertion of the chip card.

In accordance with a preferred embodiment of the invention the end position switch comprises two identical contact springs (switching contacts) which can be arranged as opening means (the end position is indicated by the switching contacts being opened) or closing means (the end position is indicated by the switching contacts being closed). The contacting forces are then acting perpendicular to the direction of insertion of the chip card. The frictional force resulting from the perpendicularly acting forces supports the holding force exerted onto the card located in the card slot of the chip card reader.

In accordance with another embodiment of the present invention the switching contacts of the end position switch as well as the reading contacts are provided in the form of contact springs and are located in the contact support in a biased manner and by means of detent or locking means. The contact springs can be provided with soldering pins or with SMT-soldering elements. The bias of the springs provides for the presence of the required contact force even for a small available spring path or path of resiliency. Thus there is a minimal amount of wear at the cusps formed by the reading contacts and the switching contacts. Due to the flat spring characteristic of the biased contacts there is only a small influence of the tolerances of the card and the slot on the contact force.

In accordance with another preferred embodiment of the invention a resilient (springy) arm is provided in the card slot to act upon the edge of the card. Preferably said resilient or springy arm is injection molded with, with the contact support so as to provide for an increased dynamic load.

The reading contacts of the invention are held or fixed in the contact support by means of suitable resilient detent or locking means. Preferably, the switching contacts are provided with holding webs which avoid a movement of the contacts in the direction of the longitudinal extension of said contacts. Moreover, means are provided at the contact support which will cause the biasing of said contact elements (contacts) when said reading contacts are inserted. Also, means are provided at said contact support for biasing the switching contacts. Suitable detent or locking means at the contact support cooperate with respective detent means at the switching contacts so as to mount said switching contacts in the contact support.

DESCRIPTION OF THE DRAWINGS

Further advantages, objects and details of the invention may be gathered from the following description of embodiments shown in the drawing; in the drawing.

DESCRIPTION OF THE PREFERRED EMBODIMENTS

Referring to FIG. 1 to 4 initially the chip card reader 1 of the invention is explained. In accordance with the invention the chip card reader 1 comprises a contact support 2 which forms together with a cover 3 a card guide means for a chip card 13 which is adapted to be inserted into the chip card reader 1 so as to reach a reading position. Preferably, the contact support 2 and the cover 3 are connected by press fit means.

Figure 1:
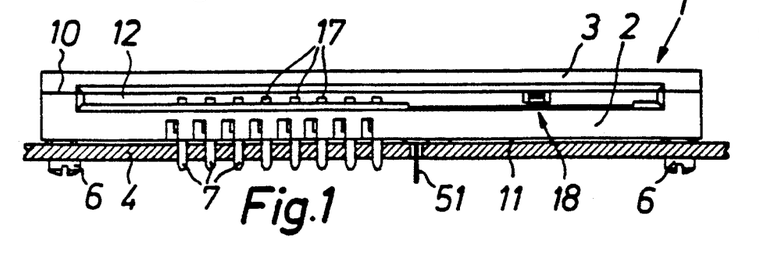
FIG. 1 is a frontal view of the chip card reader of the invention arranged on a circuit board.

The chip card reader 1 of the invention is preferably placeable directly onto a circuit board 4 provided that the contact elements of the chip card reader are of suitable design and mounting means 6 are used to fixedly mount the chip card reader 1 on said circuit board 4. As is shown in FIG. 1 the contact elements (or contacts) of the contact element support (or contact support) 2 are provided with soldering pins 7 which fit into respective openings in the circuit board 4. Even though the chip card reader of the invention is preferably adapted for the use together with a circuit board 4, the chip card reader can also be used without any problems in different ways with an external circuit.

Figure 2:
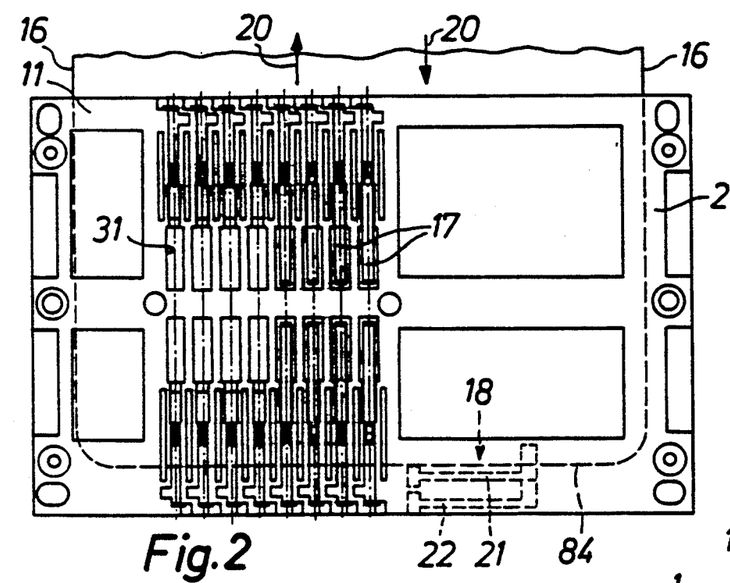
FIG. 2 is a bottom view of the chip card reader of FIG. 1, with the circuit board being removed.
Figure 3:
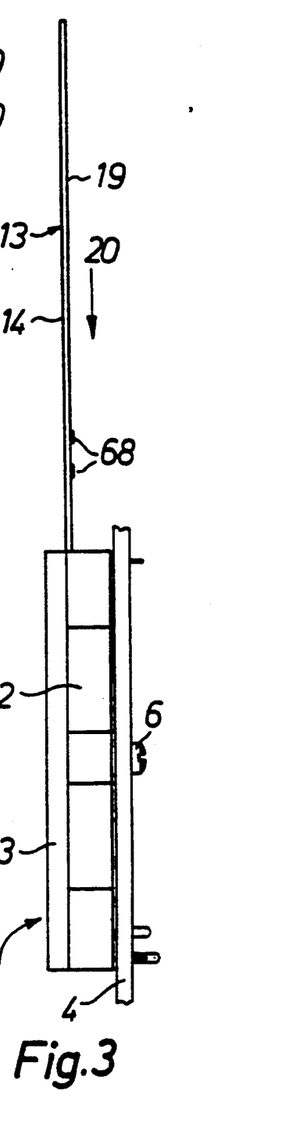
FIG. 3 is a side elevational view of the chip card reader of FIG. 1.
Figure 4:
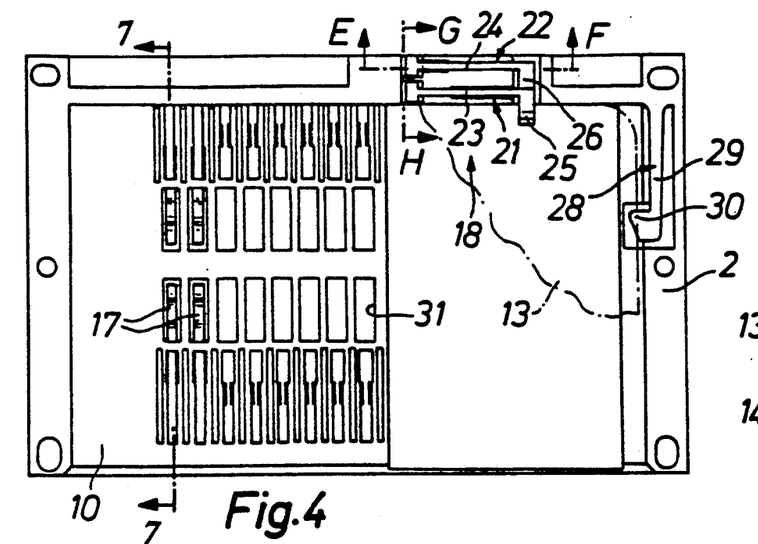
FIG. 4 is a top plan view of the chip card reader of FIG. 1 with the cover being removed.

The contact support 2 comprises—see FIG. 4—an upper surface 10 and—see FIG. 2—a bottom surface 11. When the cover 3 is mounted adjacent to the upper surface 10, then the card guide means already mentioned is formed and likewise an insert slot 12 (FIG. 1) into which the chip card 13 can moved in the direction of insertion 20.

In the contact support 2 a plurality of contact elements are arranged. In substance the following contact elements are provided: card contacts 17 and switching contacts 21 and 22 forming an end position switch 18. The switch contact 21 can be called a forward switching contact and comprises an arm 23 which forms at its free end a forward tongue 25. The switching contact 22 can be referred to as a rearward switching contact and comprises an arm 24 which forms a so called rearward tongue 26.

Specifically in FIG. 4 it can be recognized that a tolerance equalization means 28 is provided which comprises a resilient or springy arm 29 which is injection molded with the contact support so as to provide for an increased dynamic loading. The arm 29 is provided with a nose 30 which can act upon a side edge of the chip card 13.

Regarding FIG. 2 it should be noted that the card contacts 17 are each located in contact chambers 31 which are formed during manufacture of the contact support 2 for instance by an injection molding operation.

Figure 5:
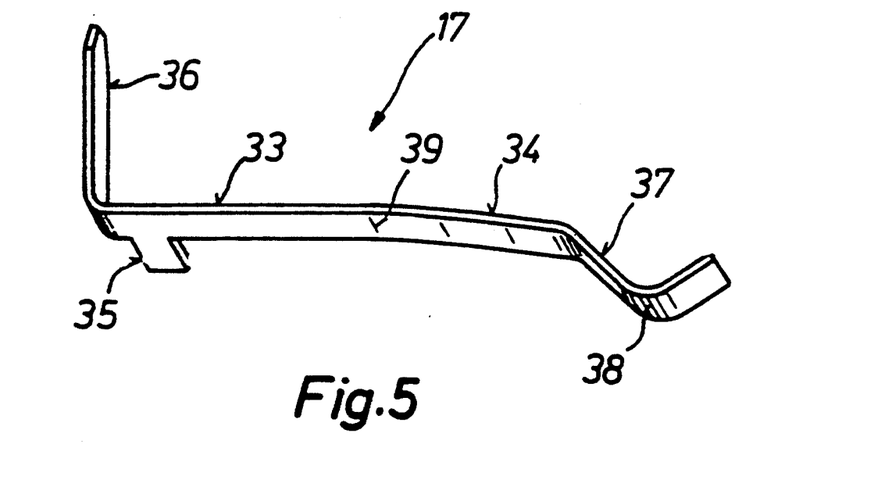
FIG. 5 is an isometric representation of a reading contact in its condition where it is not inserted in the contact support.

Turning now to FIG. 5, a card contact 17 is shown in its condition prior to being installed into a contact chamber 31. The card contact 17 is preferably, as shown, a contact spring having a first flat portion 33, a second flat portion 34, a holding tongue 35 projecting therefrom, a termination member 36 (which can be provided in the form of a solder pin 7 as shown in FIG. 1), and a contact cusp portion 37 having a contact cusp 38. The two flat portions 33 and 34 are slightly angled along a bending line 39.

Figure 6:
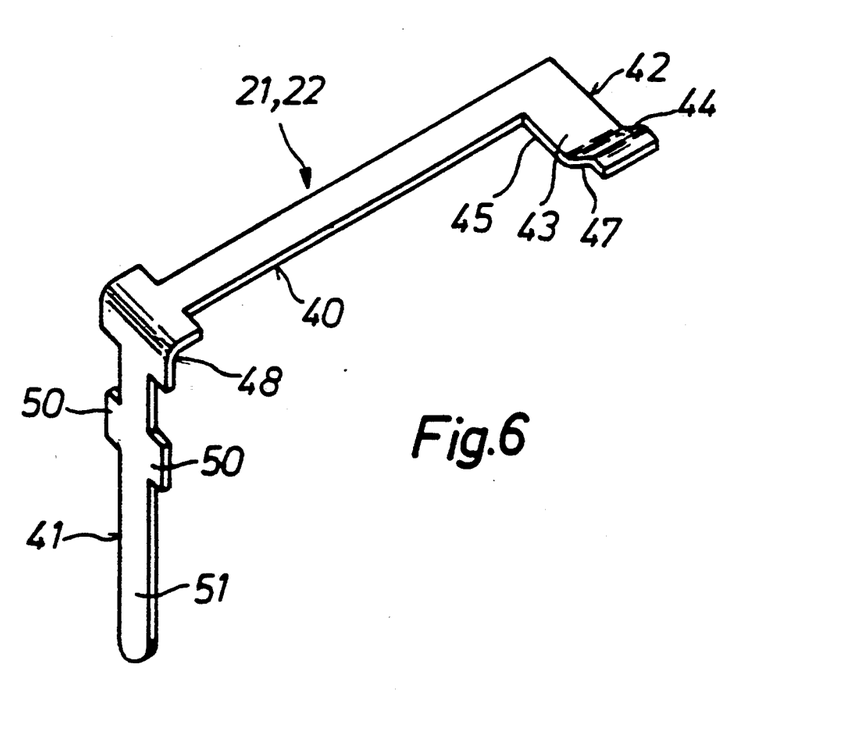
FIG. 6 is an isometric view of a switching contact of the end position switch in its condition where it is not inserted in the contact support.

FIG. 6 shows in an isometric representation the identical switching contacts 21, 22 in the form of a contact spring comprising a first flat portion 40, a second flat portion 41, an angled portion 42, a plane section 43 and an inclined section 44. The inclined section 44 forms at its bottom side a card engagement surface 47. Between the first flat portion 40 and the second flat portion 41 an angled portion 48 extends. The second plane portion 41 forms two oppositely located projections 50 as well as a termination portion 51.

Figure 7:
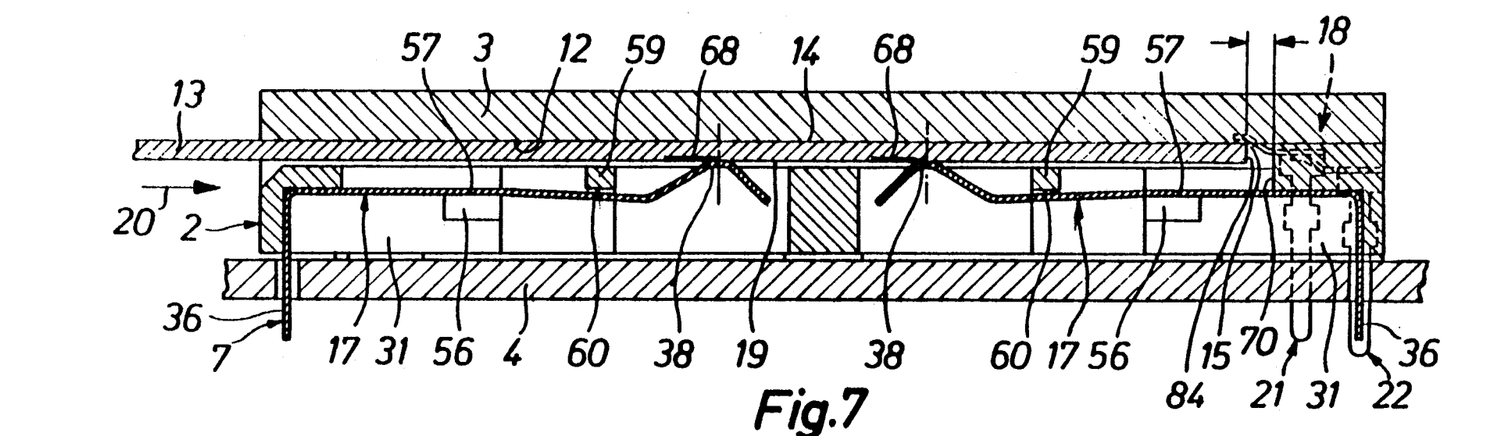
FIG. 7 is a schematic sectional view along line A-B in FIG. 4 showing the chip card not yet having reached its reading position.
Figure 8:
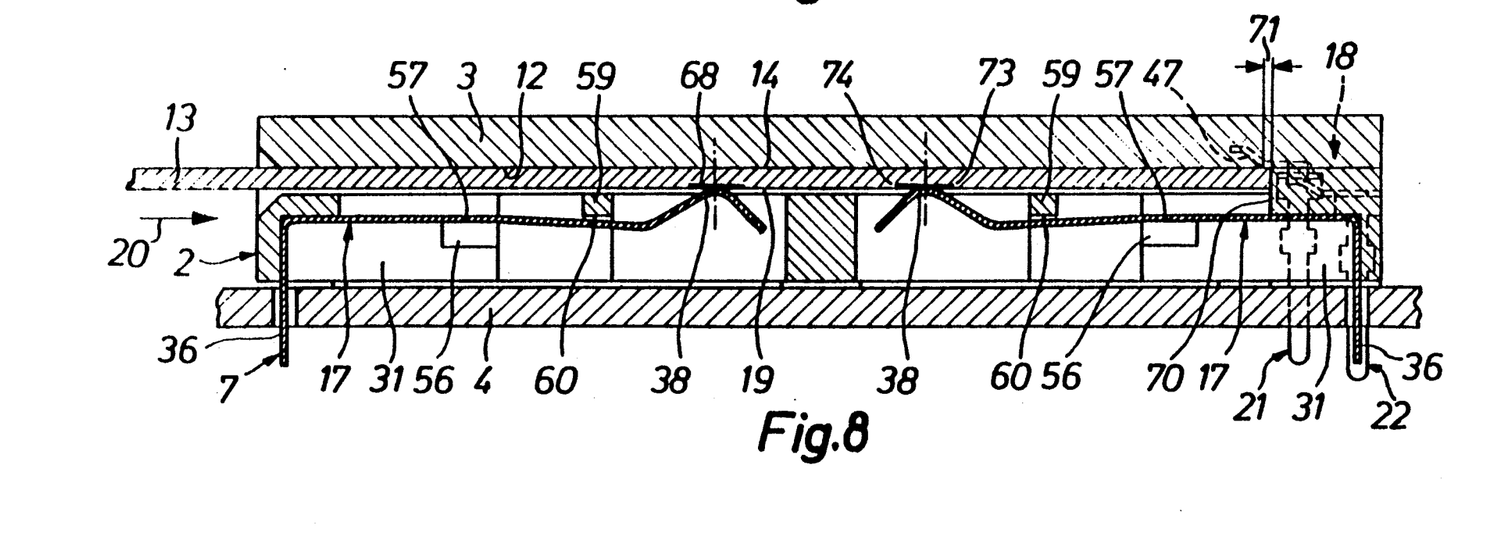
FIG. 8 is the same sectional view as FIG. 7 with the chip card having reached its reading position.
Figures 14, 15:
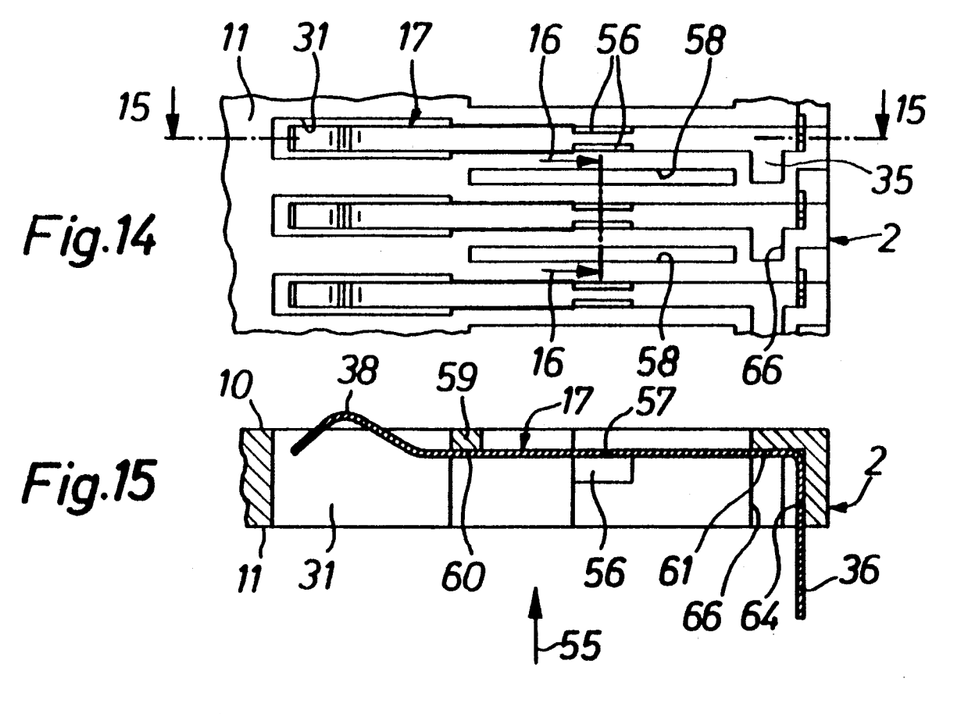
FIG. 14 is a detail of the bottom side of the contact support of FIG. 2.
FIG. 15 is a sectional view along line 15—15 in FIG. 14.
Figure 16:
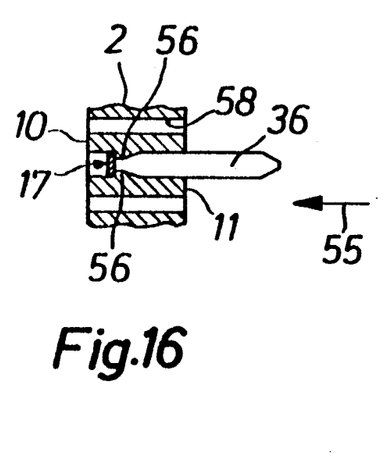
FIG. 16 is a sectional view along line 16—16 in FIG. 14.

Referring particularly to FIG. 7 and 8 as well as FIG. 14 to 17 the mounting of the reading contact 17 in accordance with the invention will be discussed. The reading contacts 17 are inserted into the contact chambers 31 from the bottom surface 11. Preferably, at that time, the contacts 17 are mounted they are still connected to the pilot or stamping strip which connects, said contacts. Between the contact chambers 31 are provided—as is shown in FIG. 14 and 16—recesses 58 which extend over a certain length. The recesses 58 extend in particular in the area of detent or locking webs 56 which extend into the chambers and of which always two are oppositely located so as to form a gap in each chamber 31. The detent webs 56 are of one piece or integral design with the contact support 2 and are manufactured of a plastic material. The recesses 58 allow for an increased resilient springy displacement movement for the detent webs 56 at the time a reading contact 17 is pressed into the chamber with its shown width and in the direction referred to by reference numeral 55. When the reading contact is urged into the contact support the detent webs 56 move resiliently in a springy manner backwardly and then return to their original position shown in FIG. 14 and maintain said contact 17 in the manner as is shown in FIG. 15. This means that said contact 17 is in resilient abutment with an abutment surface 57 of the detent webs 56 and generally assumes now, compared with FIG. 5, a straight biased position with the assistance of the abutment surface 60 formed by a web 59 and the abutment surface 61 formed by an angular portion 62 of the contact support. Moreover, the termination part 36 abuts at an abutment surface 64 of the angular portion 62.

A movement of the contact element 17 in longitudinal direction of the contact element, i.e. leftwardly as seen in FIG. 14 and 15, is blocked by the holding tongue 35 which is located in a respective recess 66 of the contact support.

The elevational arrangement of the abutment surfaces 60, 57 and 61 as shown in FIG. 15 is provided such that the reading contact 17 is biased in its position as shown.

Figure 9:
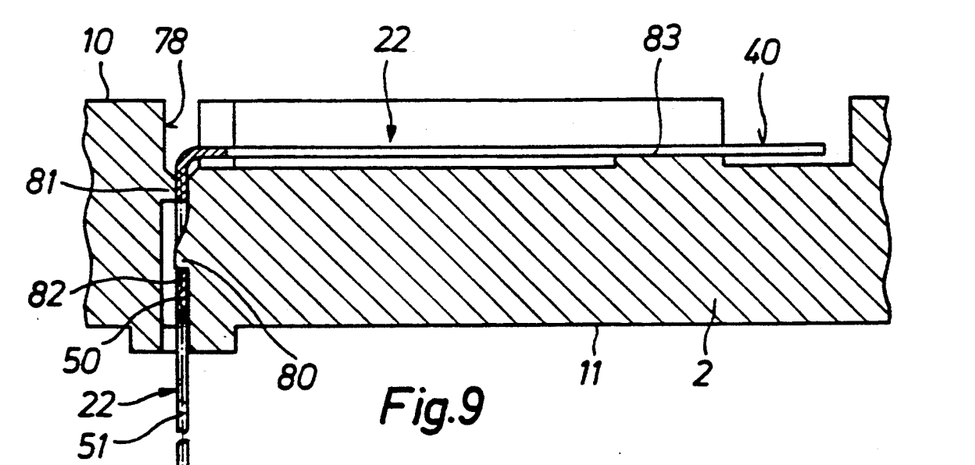
FIG. 9 a sectional view along line E-F in FIG. 4 representing a switching contact.
Figure 10:
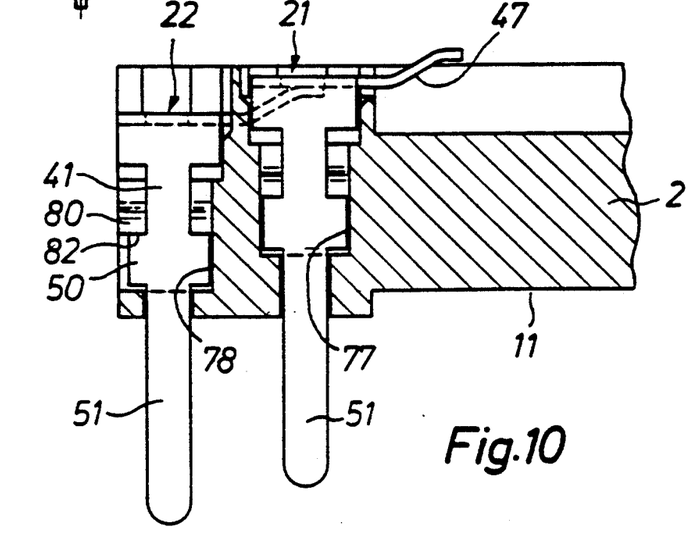
FIG. 10 is a sectional view along line F-H in FIG. 4 showing the two switching contacts.
Figures 11, 12:
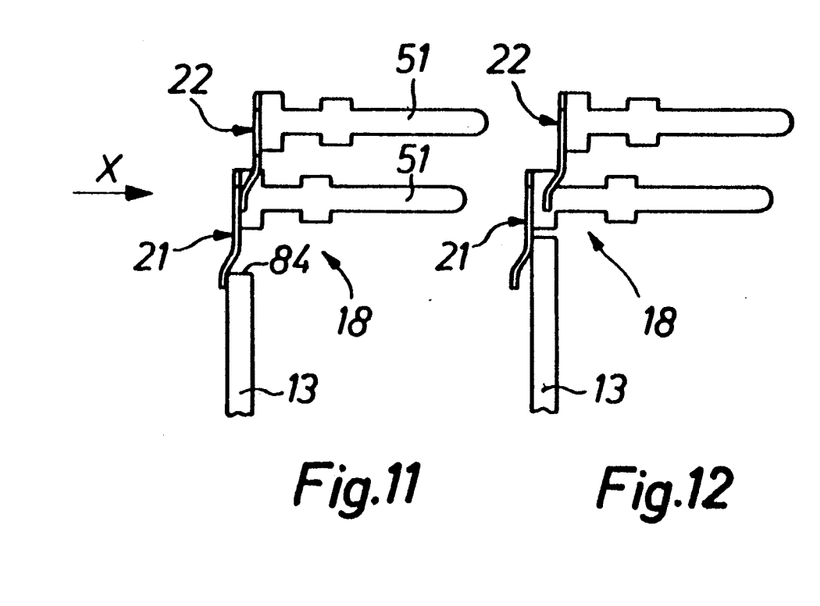
FIG. 11, 12 and 13 show schematically the arrangement of the switching contacts and their actuation by a chip card with FIG. 13 being seen in the direction X in FIG. 11 and FIG. 12.
Figure 13:
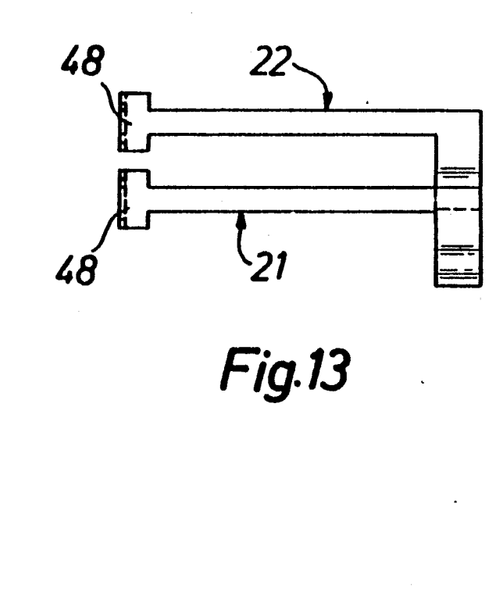

We will now discuss in some detail by referring in addition to FIG. 6 through 13 the end position switch 18 which is shown in FIG. 2 and 4. Especially in FIG. 9 and 10 it can be recognized that the two switching contacts 21 and 22 are inserted into receiving slots 77 and 78 from the upper surface 10. Respective noses 80 and 81 extend into said receiving slots 77, 78 so as to mount the contacts 21 and 22. The locking or detent webs 56 come into abutment with an abutment surface 82 in the locked or detent condition. Specifically, the backward switching contact 22 shown in FIG. 9 is located with a section of its flat portion 40 on an abutment surface 83 of the contact support 2 so as to assume a defined position. It should be noted that the switching contact 22 as well as the switching contact 21 are designed in the rest position in accordance with FIG. 6 such that between said two flat portions 41 and 42 an angle is formed which is somewhat smaller than 90°. Inasmuch as the abutment surface 83 and the abutment surfaces for the switching contact formed by the slot 78 are precisely offset by 90° the desired bias for the contact 22 (as well as the contact 21) is obtained when inserting the contacts 21 and 22 into the contact support.

While the backward contact is in biased abutment with the abutment surface 82, the forward contact 21 is located somewhat higher (see FIG. 10) and is forwardly offset with respect to the backward contact and it is biased towards the backward contact 22. The bias is such that in the not actuated position of the end position switch 18 the angled portion 42 of the forward contact 21 is in abutment with its lower surface at the upper surface of the angled portion 42 of the backward contact 22.

As can be recognized in FIG. 7 and 8 as well as 11 and 13, the forward contact 21 is arranged with its angled portion 42 such that when inserting the chip card into the chip card reader the angled portion 42 can be lifted from the lower and backward contact 22. The lifting occurs preferably by means of the backward upper edge 15 of the card 13. Said edge 15 comes into engagement with the card engagement surface 47 of the forward switching contact 21, specifically at the moment where the start of the first contact zones 68 comes into the area of the cusps 38 of the reading contact 17. For the continued movement of the card the frontal edge 15 lifts the forward contact 21 until (see FIG. 8) the upper backward edge 15 and a portion of the upper surface 14 the card 13 becomes located under the lower face 45 of the flat section 43. This occurs when about the center of the contact regions 68 is reached by the cusps 38 of the reading contacts 17. This occurs such that the forward contact presses onto the card 13 in a direction perpendicular to the direction 20 of insertion and tends to maintain the card in its reading position shown in FIG. 8. Then, the end position switch 18 is, as is clearly shown in FIG. 12—open and indicates said condition.

In addition to the measures as described, if necessary, the tolerance equalization means 28 can be provided, which can also act as a brake. The tolerance equalization means 28 comes into engagement with a side edge 16 when the card 13 is inserted in the reading position in accordance with FIG. 8. The nose 30 will then apply a certain force onto the card 13 in a direction transverse with respect to the direction 20 of insertion.

Summarizing it can be said that the chip card reader 1 of the invention is used together with a chip card 13 in the following manner. Initially, the chip card is inserted into the insertion slot 2 shown in FIG. 1 with the backward side 84 (see FIG. 2 and 7) coming first. First of all the contact zones 68 (see FIG. 7) located at the bottom surfaces 19 of the chipcard 13 come into contact with the contact cusps 38 of the reading contacts 17. At the same time the backward upper edge 15, foraged at the backward side 84 of the card 13 (see FIG. 7) engages the card engagement surface 47 and opens the end position switch 18 as soon as the distance 71 in FIG. 8 has been passed and after the backward side 84 comes into engagement at the abutment 70 formed by the contact support (2), thus reaching the reading position. In the reading position the contact cusps 38 are approximately in the center of the contact zones 68, which comprise the starting end 73 and an end 74. The card 13 is maintained in the reading position on the one hand by the force of the biased reading contacts or springs 17 and on the other hand by the forward upper switching contact which presses upon the upper surface 14 of the card 13. A respective holding force can also be provided by the tolerance equalisation means 28.

We claim:

1. A chipcard reader comprising a contact support within which reading contacts and switching contacts forming an end position switch are located, wherein the reading contacts are adapted for engagement with contact zones of a chipcard which has been inserted into said chipcard reader and moved relative to said contact support until it has reached a reading position,
   wherein the end position switch is designed such that
      it acts in its actuated position approximately perpendicular with respect to the direction of card insertion upon engagement of the card with the switch as the card is inserted into the reader such that no force component is generated which would act in the direction opposite to the direction of card insertion, wherein the chipcard has at least two contact zones, one of which is located forwardly of the other relative to the direction of card insertion, and
   wherein the end position switch comprises two similar components arranged in the direction of insertion of the chipcard behind each other such that a current circuit connected to the switching contacts is switched only if the forwardly located contact zone has already passed the contact for the other contact zone.

2. A chipcard reader according to claim 1, wherein the reading contacts at least one the switching contacts located in the contact support are contacts springs, and that the reading contacts are biased such that the engagement with the contact zones of the chipcard occur with a minimum amount of movement.

3. The chipcard reader according to claim 2, wherein the switching contacts are biased when in the installed condition.

4. The chipcard reader according to claim 1, further comprising a cover which forms together with the contact support a card guide means and an insertion slot said cover and the contact support being connected to each other.

5. The chipcard reader according to claim 1, further comprising a tolerance equalization means for providing an increased dynamic loading on a side edge of the chipcard upon engagement between the side edge and the tolerance equalization means.

6. The chipcard reader according to claim 1, wherein the end position switch comprises two contact springs which are inserted from the upper side of the contact support into receiving slots, and wherein said contact springs are held in the installed condition by means of detent means.

7. The chipcard reader according to claim 2, wherein the contact springs of the end position switch are biased.

8. The chipcard reader according to claim 7, wherein the switching contact is biased against an abutment surface at the contact support, when being inserted into the contact support due to the fact that the switching contact which is angled by less than 90° in its not inserted condition is angled by about 90° after being inserted into the contact support.

9. The chipcard reader according to claim 8, wherein the forward switching contact is biased toward the backward switching contact perpendicular with respect to the direction in which the card is inserted.

10. The chipcard reader according to claim 1, wherein the switching contacts are provided with projections which serve for locking or detent operation.

11. The chipcard reader according to claim 1, wherein at least the forward switching contact comprises an inclined card engagement surface which comes into engagement with the upper backward edge of a chipcard, whereby the end position switch is opened and wherein the switching contact is designed such that the switching contact is in engagement with the upper surface of the card with a flat section when the reading position is reached.

12. The chipcard reader according to claim 1, wherein the switching contacts have a relatively long arm formed by a flat portion from which an angled portion projects away which forms a flat section and an inclined section.

13. A chipcard reader reading according to claim 1, further comprising reading contacts designed as contact springs and adapted to be inserted into contact chambers from the bottom side of the contact support such that they are locked by detent means, and that the reading contacts are biased in the installed condition.

14. The chipcard reader according to claim 13, wherein the detent means are formed in the form of detent webs by the contact support said detent webs being adapted to resiliently recede when the reading contacts are pressed inwardly so as to allow for the insertion or installment of the reading contacts, whereupon said detent webs move snapingly back so as to hold the reading contacts in their reading position.

15. The chipcard reader according to claim 14, wherein recesses are provided so as to obtain the necessary elasticity for the detent webs.

16. The chipcard reader according to claim 13, wherein the termination portion of the reading contact is angled and adjacent to that angled portion holding tongues are formed which come into engagement with respective recesses of the contact support, so as to avoid a movement of the reading contacts in a direction along the longitudinal extension of the reading contact.

17. The chipcard reader according to claim 13, wherein it is biased due to its position between the abutment surfaces.

18. The chipcard reader according to claim 13, wherein the reading contact comprises a first flat portion and a second flat portion which are angled with respect to each other by an angle of less than 180° such that when a reading contact is inserted into a contact chamber the two flat portions are substantially located on a straight line.

19. The chipcard reader according to claim 5, wherein the tolerance equalisation means comprises an arm extending in the direction of the insertion of the card and comprises a nose which extends transversely to the arm and is formed as a single piece together with the arm and with the contact support.

* * * * *